United States Patent Office 3,704,270
Patented Nov. 28, 1972

3,704,270
PROCESS FOR PREPARING POLYURETHANES
Prella M. Phillips, Lake Jackson, Tex., assignor to The Dow Chemical Company, Midland, Mich.
No Drawing. Filed Mar. 27, 1970, Ser. No. 23,507
Int. Cl. C08g 22/38
U.S. Cl. 260—77.5 AC        11 Claims

ABSTRACT OF THE DISCLOSURE

A process for preparing polyurethane compositions by reacting a compound having a plurality of active hydrogen atoms with a compound having a plurality of isocyanate or isothiocyanate groups in the presence of, as a catalyst therefor, a copolymer comprising alternating ring-opened units of
(A) an aziridine of the formula

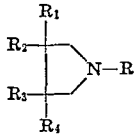

wherein
(1) R is an inert organic group;
(2) $R_1$, $R_2$, $R_3$ and $R_4$ are hydrogen, alkyl, aryl or aralkyl groups, at least two of them being hydrogen; and
(B) A vicinal epoxide or episulfide of the formula

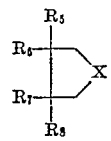

wherein
(1) X is oxygen or sulfur;
(2) $R_5$, $R_6$, $R_7$ and $R_8$ are hydrogen, alkyl, aryl, alkaryl, aralkyl, alkenyl, alkoxyalkyl, alkenyloxyalkyl, or $R_6$ and $R_7$ join to form a 5 or 6 membered cycloalkyl group, at least two of them being hydrogen.

---

This invention relates to the preparation of polyurethanes and more particularly to the preparation of polyurethanes in the presence of a copolymer selected from the group consisting of alkylene oxide/N-alkylaziridine copolymers and alkylene sulfide/N-alkylaziridine copolymers.

The novel urethane catalysts of this invention are polymers containing active hydrogen groups in the form of —OH or —SH groups and therefore, unlike the urethane catalysts of the prior art, become a part of the urethane molecule.

The catalytic copolymers employed in this invention and a method for their preparation are those taught in a copending application of Prella M. Phillips et al., Ser. No. 846,263 filed on July 30, 1969.

The catalysts employed in the process of this invention include copolymers having alternating ring opened units of
(A) an aziridine of the formula

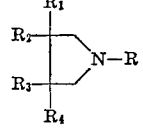

wherein
(1) R is an inert organic group;

(2) $R_1$, $R_2$, $R_3$ and $R_4$ are hydrogen, alkyl, aryl or aralkyl groups, at least two of them being hydrogen; and
(B) a vicinal epoxide or episulfide of the formula

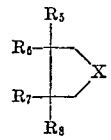

wherein
(1) X is oxygen or sulfur;
(2) $R_5$, $R_6$, $R_7$ and $R_8$ are hydrogen, alkyl, aryl, alkaryl, aralkyl, alkenyl, alkoxyalkyl, alkenyloxyalkyl, or $R_6$ and $R_7$ join to form a 5 or 6 membered cycloalkyl group, at least two of them being hydrogen.

Also to be included are those copolymers which contain at least trace amounts of a coreactant.

These copolymers may be prepared by reacting or contacting an N-substituted aziridine of the formula (I) 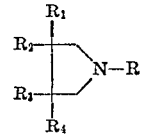

with a vicinal epoxide or episulfide of the formula (II) 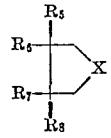

wherein X is oxygen or sulfur, R is an inert organic group and $R_1$–$R_8$ are H or inert organic groups, the preferred compounds being those wherein R is an inert hydrocarbon group; $R_1$, $R_2$, $R_3$ and $R_4$ are hydrogen, alkyl, aryl or aralkyl groups, at least two of them being hydrogen; $R_5$, $R_6$, $R_7$ and $R_8$ are hydrogen, alkyl, aryl, alkaryl, aralkyl, alkenyl, alkoxyalkyl, alkenyloxyalkyl or $R_6$ and $R_7$ join to form a 5 or 6 membered cycloalkyl group, at least two of them being hydrogen. Optionally, a compound bearing at least one active hydrogen, hereinafter referred to as a coreactant, is included in the process. Such coreactants are compounds such as water, alcohols, carboxylic acids, thiols, amines, and the like. The backbone structure of the novel copolymers, exclusive of any chain-extending or terminal group, is characterized by alternating ring-opened units of said aziridine monomer and epoxide or episulfide monomer.

The copolymers are unique in that the backbone structure consists essentially of alternating ring-opened units of the aziridine monomer and the epoxide or episulfide monomer. To wit, the copolymer backbone, exclusive of any chain-extending or terminal groups, contains the repeating copolymer unit (III)  $\{CR_1R_2\text{—}CR_3R_4\text{—}N(R)\text{—}CR_5R_6\text{—}CR_7R_8\text{—}X\}$ wherein the values for X, R and $R_1$–$R_8$ are as defined above. The copolymer unit may be repeated up to 1,000 times or more. In some instances, the copolymer chain may be interrupted or terminated by the residue of an optionally included coreactant; said residue being derived by the removal of active hydrogen, i.e., replaceable hydrogen, from said coreactant. A coreactant can therefore be advantageously included to provide a desired terminal group or a chain-extending group in the backbone of the linear polymers, and, polyfunctional coreactants having 3 or more active sites can be used to obtain branched polymers. When a coreactant is present in the process, the polymeric product is represented by the general structural formula

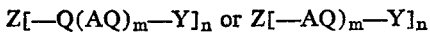

wherein Z is the coreactant residue derived by the removal of $n$ active hydrogens from a coreactant; AQ is one copolymer unit having Formula III above; A is a ring-opened unit of aziridine monomer; Q is one ring-opened unit of epoxide or episulfide monomer; Y is hydrogen or

$m$ is an integer between 1 and about 1000 or more; and $n$ is an integer of at least 1 and is equal to the number of active hydrogens abstracted from the coreactant. Most generally, Y is hydrogen.

A coreactant in the subject copolymers is, in general, any compound having one or more active hydrogen atoms, i.e., hydrogens which are replaceable under the process conditions and are generally active in the Zerewitinoff Reaction.

Suitable coreactants are compounds such as the alcohols, aliphatic polyols, phenols, alkanolamines, primary or secondary amines, polyalkylenepolyamines, polyalkylenimines, amides, poyamides, thiols, carboxylic acids having a $K_a$ value less than $6.5 \times 10^{-2}$, oxyalkylated derivatives prepared by condensing alkylene oxides onto any of the above compounds, natural products, and also inorganic compounds such as water, hydrogen sulfide and ammonia.

Suitable coreactants therefore include:

(a) Alcohols such as alkanols having 1 to about 25 carbon atoms, e.g., methanol, ethanol, isopropanol, t-butanol, cyclohexanol, 3-octanol, β-phenethyl alcohol, 1-dodecanol and 1-octadecanol; alkenols having up to about 20 carbon atoms, such as allyl alcohol, crotyl alcohol, methylvinyl carbinol, linoleyl alcohol; alkynols having up to about 10 carbon atoms such as propargyl alcohol, 1-pentyn-5-ol, 4-octyn-2-ol; alkoxy- and aroxy-substituted alcohols such as 2-methoxyethanol, 2-isobutoxyethanol, 2-phenoxyethanol, 1 - (2 - butoxyethoxy)-2-propanol, 1-isobutoxy-2-propanol, 1-methoxy-2-propanol;

(b) Aliphatic polyols such as ethylene glycol, propylene glycol, butylene glycol, 1,3-dihydroxyhexane, sucrose, glucose, sorbitol, pentaerythritol, glycerol, and oxyalkylated derivatives of such polyols, polyethylene glycol, polypropylene glycol, polybutylene glycol, alkyl or aryl monoethers of such polyalkylene glycols, e.g., polyethylene glycol phenyl ether and polypropylene glycol propyl ether, polyvinyl alcohol, polyepichlorohydrin, copolymers of ethylene and allyl alcohol or β-hydroxyethylacrylate;

(c) Phenols such as phenol, nonylphenol, resorcinol, hydroquinone, 1,3,5 - trihydroxybenzene, 4 - (methylthio) phenol, o-chlorophenol, thiophenol, 2-ethylthiophenol, p-nitrophenol, o - phenylphenol, 4 - bromophenol, 2,4,5 - trichlorophenol, o- or p-cresol, and polyphenols such as p,p'-isopropylidenediphenol (Bisphenol A), and the Novolac resins which are the condensation products of phenol and formaldehyde;

(d) Alkanolamines such as mono, di- and triethanolamine, mono-, di- and tripropanolamine, N,N,N',N'-tetraethanolethylenediamine, N,N-dipropanolethanolamine;

(e) Primary and secondary amines such as aniline, butylamine, octadecylamine, allylamine, diethyleneamine, cycohexylamine, ethylenediamine, propylenediamine, and butylenediamine;

(f) Polyalkylenepolyamines and polyalkylenimines such as diethylenetriamine, triethylenetetramine, dipropylenetriamine, tripropylenetetramine, dibutylenetriamine, and polymeric condensation products of alkylene dihalides and alkylene diamines, e.g., the reaction product of ethylenediamine and 1,3-dichloropropane, and polymers on up to polyethylenimine, polypropylenimine or polybutylenimine having a molecular weight of about 1 million or more.

(g) Amides such as formamide, acetamide, benzamide, N-methylbenzamide, acrylamide, methacrylamide, stearamide and polyamides such as nylon and polyacrylamide;

(h) Thiols such as methyl mercaptan, octyl mercaptan, and sulfur-containing polymers such as polyethyleneepisulfide and polypropylenesulfide.

(i) Carboxylic acids such as benzoic, acrylic, methacrylic, adipic, acetic, heptanoic, stearic, tall oil, tall oil acids, rosin, oleic, linoleic, latic, glycine, polyacrylic, polymethacrylic, p-chlorobenzoic, 2,4-dimethylbenzoic, citric, coal tar acids and naphthenic acid, and polymers containing terminal carboxy groups such as carboxy-terminated polybutadienes and polyesters, copolymers of ethylene and acrylic acid; and (j) Natural products such as the carbohydrates, sugars, cellulose, starch, proteins, gums, and derivatives of such products so long as an active hydrogen is available, such as methylcellulose.

The copolymers which make up the catalysts employed in the present invention vary from a low viscosity fluid to a solid and other physical properties, such as solubility, likewise vary in accordance with molecular weight, functionality and the substituents on the initial reactants.

These catalysts may be employed either alone or in combination with known catalysts. Generally, the total catalyst concentration employed is in the range of from about 0.5 to about 8.0 parts by weight per 100 parts of polyol employed while the concentration of any one catalyst is employed in the range of from about .005 to about 5 parts and preferably from about 0.08 to about 3 parts by weight per 100 parts by weight of polyol employed. The amount of catalyst is often times dependent upon the particular polyol or blend of polyols employed as those skilled in the art will readily recognize.

Other catalysts with which the new catalysts of this invention may be employed include tertiary amines of which triethylenediamine bis(dimethyl ethylamino ether) and N-ethylmorpholine are examples.

Tin salts, for example, stannous octoate, stannous oleate, dibutyl tin dilaurate and the like may also be employed as catalysts in combination with the copolymer catalysts of this invention.

Other catalysts which may be employed in combination with those of the present invention are metal soaps including, for example, lead naphthenate, zinc naphthenate, aluminum distearate, aluminum tristearate, plumbous stearate, plumbous stearate (basic), aluminum monostearate, zinc stearate, cadmium stearate, silver acetate, lead pelargonate and the like. These catalysts are discussed more fully in U.S. Patent No. 3,391,091.

The new catalysts of this invention may be employed in the preparation of both rigid and flexible polyurethane foams including those known as semi-rigid and semi-flexible as well as the non-foamed urethane elastomers.

Polyurethanes are generally regarded as those products resulting from the reaction of a compound having a plurality, 2 or more, of active hydrogen atoms, usually in the form of a hydroxyl group, but the active hydrogens may also be amino hydrogens or thiol groups, with an organic compouund having a plurality, 2 or more, of isocyanate or isothiocyanate groups.

Suitable polyols which may be employed as the active hydrogen-containing compound include polyether polyols which are the condensates of a lower alkylene oxide, or an epihalohydrin or mixtures thereof with a polyhydric compound having from about 2 to about 8 active hydrogen atoms such as, for example, polyhydric alcohols, alkylene polyamines, carbohydrates, oxygen containing inorganic acids, and mixtures thereof, said polyether polyols having a hydroxyl equivalent weight of from about 80 to about 2500.

The polyether polyols may be either block condensates wherein any of the lower alkylene oxides and/or epihalohydrins are condensed with the polyhydric compound, alternating block condensates wherein two or more of the lower alkylene oxides and/or epihalohydrins are condensed alternately in any order with the polyhydric compound or heteric condensates wherein a mixture of lower alkylene oxides and/or epihalohydrins is condensed with the polyhydric compound or a combination block and heteric condensate wherein a mixture of lower alkylene oxides and/or epihalohydrins are condensed with a previously prepared block condensate.

Suitable lower alkylene oxides include, for example, those containing from 2 to 4 carbon atoms such as ethylene oxide, propylene oxide, 1,2-butylene oxide, 2,3-butylene oxide and the like.

Suitable epihalohydrins include, for example, epichlorohydrin, epibromohydrin, epiiodohydrin and the like.

Suitable polyhydric alcohols include, for example, ethylene glycol, propylene glycol, neopentyl glycol, 1,4-butane diol glycerol, trimethylolpropane, pentaerythritol, hexanetriol and the like.

Suitable carbohydrates include for example, hexitol, heptitol, sorbitol, manitol, sucrose and the like.

Suitable alkylene polyamines include, for example, ethylenediamine, propylenediamine, butylenediamine, pentamethylenediamine, hexamethylenediamine and the like.

Suitable oxygen containing inorganic acids include, for example, phosphoric acid and the like.

Other suitable polyols include the acid catalyzed phenol-aldehyde reaction products and the oxyalkylated derivatives thereof which may be represented by the general formula

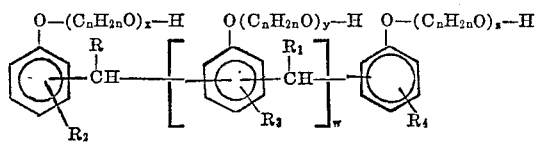

wherin $R$, $R_1$, $R_2$, $R_3$ and $R_4$ are independently selected from hydrogen and an alkyl group having from about 1 to about 4 carbon atoms, $n$ is an integer having a value from about 1 to about 4, $x$ $y$ and $z$ are numbers having a value of from about 0 to about 6 and $w$ is an integer having a value of from about 0 to about 4.

The polyisocyanates which may be suitably employed are those having two, three or more NCO groups. Examples of suitable polyisocyanates are hexamethylenediisocyanate, tolylene 2,4- or tolylene 2,6-di-isocyanate, diphenyl methane diisocyanate, m-phenylene diisocyanate, p-phenylene diisocyanate, naphthalene diisocyanate, dimethyl diphenyl methanediisocyanate, dianisidine diisocyanate and "Papi," (polymethylene polyphenylisocyanate) having the general formula

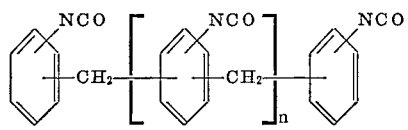

wherein $n$ has an average value of about 1 or mixtures of any two or more of such isocyanates. The isocyanate is employed in an amount corresponding to at least about a chemically equivalent proportion to react with the total OH groups in the mixture of both the polyether polyol and the water initially used, preferably in an amount corresponding to from about 1 to about 1.15 NCO group per reactive hydroxyl group in both the water and the polyether polyol employed. The corresponding isothiocyanates may also be employed.

Other ingredients which may be employed in the polyurethane compositions include fire retardant agents, blowing agents, fillers, cell control agents and the like.

Suitable blowing agents include the low boiling hydrocarbons and halohydrocarbons such as, for example, methylene chloride, trichlorofluoromethane and the like. In flexible polyurethane foams, water may also be employed as a blowing agent.

Suitable cell control agents include the silicone oils such as DC 190, available from Dow Corning Corporation, L–520, available from Union Carbide Corp., and the like.

The following non-limiting examples are illustrative of the present invention but are not to be construed as limiting to the scope thereof.

EXAMPLE 1

Preparation of catalyst A (N-ethylaziridine/propylene oxide copolymers)

Into a stainless steel autoclave were charged 3 ml. distilled water, 334 ml. propylene oxide and 664 ml. 1-ethylaziridine. The autoclave was sealed, placed into a jacketed rocker, and heated to 170–174° C. for 17 hours. The recovered product was charged to a rotary evaporator and the volatiles were removed at 90° C. and <2 mm. of Hg pressure. The recovered copolymer weighed 610 gms.

Preparation of catalyst B (N-ethylaziridine/ethylene oxide copolymer)

Into a 1410 ml. stainless steel autoclave were charged 3 ml. distilled water and 600 ml. 1-ethylaziridine. The autoclave was capped and 219 gms. ethylene oxide was pressured into it. The autoclave was sealed, placed into a jacketed rocker, and heated to 123–127° C. for 17 hours. The recovered product was charged to a rotary evaporator and the voltatiles were removed at 90° C. and <2 mm. of Hg pressure. The recovered copolymer weighed 554 gms. and had a viscosity of 887.0 cks. at 25° C. An approximate number average molecular weight of 3200 was obtained using gel permeation chromatographic techniques.

EXAMPLE 2

Several foams were prepared from the following recipe:

|  | G. |
|---|---|
| of a glycerine initiated polyoxypropylene glycol having an OH equivalent weight of about 1000 | 100 |
| water | 4 |
| DC–190 silicone oil | 1.0 |
| catalyst as prepared in Example 1 (see Table I) | X |

The components of the above recipe were premixed and then mixed with 49.7 grams of an 80/20 mixture (by weight) of 2,4- and 2,6-toluene diisocyanate, respectively, and allowed to rise freely in a container.

The type and quantities of catalyst employed and foam rise times are given in the following Table I.

TABLE I

| Foam: | Stannous octoate, grams | Amine catalyst (grams) | Rise time (seconds) |
|---|---|---|---|
| 1 | 0.30 | Ex. I-B (0.20) | 99 |
| 2 | 0 | Ex. I-B (1.0) | 111 |
| 3 | 0 | Ex. I-B (3.0) | 41 |
| 4 | 0 | Ex. I-A (1.0) | 153 |

Each of the above-prepared flexible foams were white in color and appeared to have good cell structure.

Presently preferred organic coreactants are the aliphatic alcohols, polyols, carboxylic acids, and oxyalkylated polyols derived by condensing alkylene oxide of 2 to 4 carbon atoms onto such aliphatic alcohols and polyols.

Water is the presently preferred inorganic coreactant. The effect of water on the oxamination or thiamination process is quite pronounced, e.g., the rate of reaction increases and the molecular weight of the copolymer decreases as one increases the amount of water in the reaction mixture. Water is suitably included in the process in amounts up to about 35 mole percent, based on (a) the moles of aziridine (when a molar excess of epoxide or episulfide is used), or (b) the moles of epoxide or episulfide (when a molar excess of aziridine is used). At higher concentrations, i.e., above about 35 mole percent, alkanolamines or mercaptoalkyleneamines are formed and homopolymerization of the aziridine and/or the epoxide or episulfide monomers occurs. Accordingly care should be taken to control the amount of water in the process system and reactants.

Mixtures of inorganic and/or organic coreactants may be used if desired. Typical mixtures of coreactants comprise water and another coreactant.

Should a copolymer having "block" characteristics be desired, the result is effected by treating one of the subject copolymers as a correactant and further reacting the copolymer with another monomer of aziridine and/or another monomer of epoxide or episulfide. Thus, the copolymer of N-ethylaziridine and ethylene oxide could be further reacted under the subject process conditions with monomers of N-phenethylaziridine and propylene sulfide to give a product having the structural formula

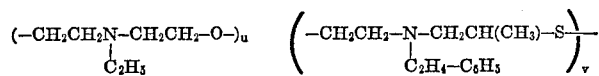

wherein $u$ and $v$ are integers of 1 to about 1,000 or more.

The chain length of the copolymer is variable, and is found to vary in an inverse manner with the amount of coreactant in the process. Accordingly, copolymers having the longest copolymer chain segments are obtained when little or no coreactant is present. When the coreactant is present in a major amount, i.e., more than about 0.2 equivalent of active hydrogen per mole of aziridine, epoxide or episulfide monomer, based on which ever monomer is present in the lesser amount, than oligomers of the copolymer are produced which contain an average of 1 to about 10 copolymer units. By using a substantial excess of coreactant, compounds can be porduced which contain as few as one copolymer unit per active hydrogen or less since not every active hydrogen need be replaced by a copolymer chain segment, particularly in such polyfunctional coreactants as polyvinylalcohol, polyalkylene glycols, polyalkylene polyamines and carbohydrates.

The chain length of the copolymer can be easily extended by using a polyfunctional coreactant. Thus, when, water, methanol or ethylene glycol is present, the copolymer is substantially linear. When coreactants such as glycerol are used, a copolymer is obtained which is branched, each of the three chains being attached to the glycerol residue and being terminated on the other end with hydroxyl groups or amino groups, depending on which monomer supplies the terminal groups. Typically, the terminal group is a hydroxyl group.

Reaction conditions

Surprisingly, substantially any molar ratio of N-substituted aziridine to epoxide or episulfide reactant can be used in the subject reaction since under suitable conditions the copolymer is found unexpectedly to terminate when one of the reactants is depleted. A suitable ratio, based on convenience and economy is between about 20:1 and 1:20 of N-substituted aziridine:epoxide. A preferred ratio is between about 4:1 and 1:4.

A reaction temperature is suitably selected between about 25° C. and about 300° C. When substantially no coreactant is present in the process, a temperature between about 100° C. and 200° C. is preferred. When a coreactant is present in more than trace amounts, however, the preferred temperature may vary from the lower end of the temperature range to the higher end depending upon (a) concentration of coreactant, (b) reactivity of the coreactant, and (c) the reactivity of each of the aziridine, epoxide and episulfide monomers.

The reaction rate increases in proportion to the amount of coreactant, and with the reactivity of the aziridine, epoxide and episulfide monomers.

The relative reactivities of the monomers and the relative reactivities of the coreactants is generally well known. For example, ethylene oxide is known to be more reactive than propylene oxide or butylene oxide; N-ethylaziridine is known to be more reactive than N-decylaziridine; C-substituted aziridines are generally less reactive than the corresponding unsubstituted homologs; and carboxylic acids are known to be more reactive than alcohols; hence, the more reactive the compounds used in the process and the higher the concentration of coreactant, the lower the reaction temperature may be to achieve a given rate of polymerization. In accordance with the above, a preferred temperature for the faster reactions, based on convenience and economy, is between about 50° C. and about 120° C., and for the slower reactions the preferred temperature is above 100° C. and below about 250° C.

The reactants should be maintained in contact one with the other(s) until the desired copolymer is obtained. A suitable reaction time may vary from a few hours to a few days depending upon the reaction temperature and reactivity of the aziridine and epoxide reactants. Typically, a reaction time of six to forty-eight hours is sufficient and therefore preferred.

The reaction pressure is such as to keep the reaction mixture substantially liquid and is suitably atmospheric or autogenous pressure is preferred.

The reaction can be run near or in an inert solvent, such as benzene, toluene, xylene, and the like.

The reaction can be run as a batch process wherein all ingredients are mixed simultaneously, or as a continuous process wherein reactants and/or coreactant(s) are fed continuously or incrementally into the system. In either process, the polymeric product can be treated as a coreactant in further oxamination or thiamination reactions since it contains at least one active hydrogen which can be abstracted to form a site on which another copolymer chain segment can be attached.

The physical state of the copolymers varies from a low viscosity fluid to solid, and other physical properties, such as solubility, likewise vary in accordance with molecular weight, functionality and the substituents on the initial reactants. Accordingly, the products can be tailored to fit a multitude of needs by simply varying the choice and proportions of reactants and/or coreactant. All of the copolymers have the common property of containing basic amino nitrogens and divalent atoms of oxygen or sulfur in their backbones.

Some of the copolymers may have a tendency to discolor upon aging. Such discoloration can be substantially inhibited in the liquid products by adding a stabilizing amount of an antioxidant, such as sodium borohydride, hydrazine or hydrazine hydrate to the copolymer.

Specific embodiments

The following examples further illustrate the invention.

A general procedure

Charge the N-substituted aziridine and vicinal epoxide or episulfide into an autoclave equipped for agitation. Seal the autoclave, heat to the desired reaction temperature and maintain the reactants at such conditions of temperature and pressure with mixing until the desired reaction product is formed. Remove the volatile components under reduced pressure and recover the product.

When a coreactant is used, the above procedure is followed except that the coreactant is generally charged with the aziridine and epoxide or episulfide reactants. The order of addition of the coreactant is not important.

The copolymer products were analyzed by one or more of the following analytical methods: gas-liquid partition chromatography (GLPC), in frared (IR), nuclear magnetic resonance (NMR) and gel permeation chromatography (GPC).

EXAMPLE 3

Reaction between N-ethylaziridine and propylene oxide

Using the above general procedure, N-ethylaziridine (EtAz) and propylene oxide (PO) were reacted together at various reaction temperatures and times to give copolymers. Trace amounts of water were present in the monomers (100 to 700 p.p.m.), the autoclave was stainless steel or glass and the pressure was autogenous. The results are tabulated in Table II.

TABLE II

| Number | EtAz (g.) | G. | Temperature (° C.) | Time (hours) | Copolymer (g.) | $\eta$ At 25° C. (cks.) |
|---|---|---|---|---|---|---|
| 1 | 24.0 | 82.2 | 175 | 22.0 | 36.1 | Liquid |
| 2 | 24.0 | 82.2 | 130 | 22.0 | 33.4 | 752 |
| 3 | 24.0 | 82.2 | 130 | 46.5 | 40.2 | 855 |
| 4 | 24.0 | 82.2 | 130 | 138.5 | 41.1 | 740 |
| 5 | 48.0 | 41.1 | 130 | 22.0 | 39.6 | 660 |
| 6 | 48.0 | 41.1 | 130 | 90.0 | 70.8 | 1,318 |
| 7 | 75.0 | 20.6 | 130 | 20.0 | 13.0 | 608 |
| 8 | 24.0 | 82.2 | 100 | 21.0 | 10.6 | Liiudq |
| 9 | 48.0 | 41.1 | 100 | 21.0 | 9.7 | Liquid |
| 10 | 24.0 | 410.0 | 175 | 22.0 | 43.3 | Liquid |

The above copolymers were fluids ranging in color from light yellow to amber. They were soluble in benzene, ethanol, acetone, n-hexane, CCl$_4$, and insoluble in water. Regardless of the mole ratio of the reactant epoxy and aziridine monomers, the copolymer product always contained approximately equal molar amounts of each reactant. Table II–A shows the mole ratio of reactants used and the mole ratio of nitrogen to oxygen found in the resulting copolymers of Example 3, Experiments 1–10.

TABLE II-A

| Number: | Mole ratio EtAz:PO | Mole ratio N:O found |
|---|---|---|
| 1 | 1:4 | 0.98 |
| 2 | 1:4 | 1.05 |
| 3 | 1:4 | 1.08 |
| 4 | 1:4 | 0.96 |
| 5 | 1:1 | 1.13 |
| 6 | 1:1 | 1.10 |
| 7 | 3:1 | 1.10 |
| 8 | 1:4 | 1.07 |
| 9 | 1:1 | 1.09 |
| 10 | 1:21 | 0.91 |

EXAMPLE 4

Reactions between other aziridine and epoxide monomers

Using substantially the same equipment and procedure set forth in Example 3, other aziridine and epoxide monomers were reacted. The results are tabulated in Table III.

In Table III, and hereinafter, the following abbreviations are used: EtAz=N-ethylaziridine; DecylAz=N-decylaziridine; AllylAz=N-acetylaziridine. CyEtAz=N-(2 - cyano)ethylaziridine; MoEtAz=N-(2-morpholino)ethylaziridine; PhEtAz=N-phenethylaziridine; AzEtAcet =2-(1-aziridinyl) ethyl acetate; EO=ethylene oxide; PO=propylene oxide; Mix-I="Nedox" 1114—a commercially available product which is a mixture of C$_9$ to C$_{12}$ hydrocarbons having 1,2-epoxy groups; Mix-II=20.5 g. PO and 2.32 g. EO; AGE=allyl glycidyl ether; CPO= cyclopentene oxide; and StyOx=styrene oxide.

The above copolymers had N/O molar ratios substantially the same as predicted by theory.

The solubility of the copolymers in various solvents was determined and is reported below.

| No. | Solvents |
|---|---|
| 1 | Water, ethanol, acetone, ethylene glycol, hexane, CCl$_4$. |
| 2 | (Water insoluble). |
| 3 | Ethanol, acetone, and benzene (water insoluble). |
| 4 | Water, ethanol, acetone. |
| 5 | Acetone (insoluble in water, ethanol or benzene). |
| 6 | Ethanol, benzene (insoluble in water or acetone). |
| 7 | Not determined. |
| 8 | Acetone, benzene (insoluble in water or ethanol). |
| 9 | Ethanol, acetone, benzene (water insoluble). |
| 10 | Ethanol, acetone, benzene. |
| 11 | Ethanol, acetone, benzene (water insoluble). |
| 12 | Acetone, benzene (water insoluble). |
| 13 | Acetone, n-hexane (water insoluble). |

EXAMPLE 5

Effect of water

Using substantially the procedure and equipment set forth in Example 3, the effect of water in the reaction was determined and the results tabulated in Table IV. The reaction conditions of 130° C., autogenous pressure,

TABLE IV

| Number: | PO (mole) | Water (mole) | Yield (wt. percent)[1] | $\eta$ At 25°C (cks.) |
|---|---|---|---|---|
| 1 | 0.22 | 0.010 | 27 | 549 |
| 2 | 0.22 | 0.028 | 61 | 194 |
| 3 | 0.34 | 0.011 | 28 | 608 |
| 4 | 0.30 | 0.037 | 66 | 210 |
| 5 | 0.34 | 0.064 | 96 | 157 |
| 6 | 0.67 | 0.038 | 63 | 428 |
| 7 | 1.05 | 0.011 | 45 | 660 |
| 8 | 1.05 | 0.052 | 67 | 428 |
| 9 | 1.05 | 0.094 | 80 | 251 |
| 10 | 1.05 | 0.175 | 93 | 128 |
| 11 | 4.19 | 0.015 | 77 | 752 |
| 12 | 4.19 | 0.098 | 91 | 245 |
| 13 | 4.19 | 0.181 | 93 | 125 |
| 14 | 4.19 | 0.344 | 97 | 66 |

[1] Wt. percent yield based on 100% conversion of aziridine or epoxide monomer, whichever was in the lesser molar amount.

TABLE III

| Number: | G. | G. | Temperature (° C.) | Time (hrs.) | Copolymer (g.) | $\eta$ At 25° C. (cks.) |
|---|---|---|---|---|---|---|
| 1 | EtAz, 160.5 | EO, 66.0 | 120 | 48 | 165.3 | 650 |
| 2 | DecylAz, 9.7 | PO, 2.9 | 130 | 22 | 4.2 | (1) |
| 3 | AllylAz, 16.1 | PO, 11.5 | 130 | 88 | 16.6 | (1) |
| 4 | AcetylAz, 24.9 | PO, 17.3 | 130 | 88 | 24.9 | Viscous |
| 5 | CyEtAz, 33.1 | PO, 41.1 | 100 | 21 | 19.1 | Viscous |
| 6 | EtAz, 24.0 | Mix-I, 64.0 | 130 | 88 | 25.6 | (1) |
| 7 | MoEtAz, 93.6 | PO, 69.6 | 120 | 48 | 123.0 | 8,784 |
| 8 | PhEtAz, 104.3 | PO, 20.6 | 130 | 69 | 64.1 | 6,664 |
| 9 | EtAz, 75.0 | AGE, 48.2 | 130 | 24 | 79.3 | 1,082 |
| 10 | EtAz, 75.0 | Mix-II, 43,7 | 130 | 21 | 84.5 | 1,737 |
| 11 | AzEtAcet, 100.0 | PO, 41.0 | 130 | 20 | 77.7 | 192 |
| 12 | EtAz, 75.0 | CPO, 48.6 | 200 | 20.5 | 42.6 | Viscous |
| 13 | EtAz, 75.0 | StyOx, 71.3 | 174 | 20.5 | 108.9 | Viscous |

[1] Liquid.

and 20 hrs. were held constant. One mole of N-ethylaziridine was used in each experiment.

EXAMPLE 6

Oxamination reaction in the presence of alcohols

Using substantially the same equipment and procedure set forth in the General Procedure, several experiments were conducted between N-ethylaziridine, ethylene or propylene oxide, and various alcohols as coreactants. The results are tabulated in Table V.

TABLE V

| | EtAz (g.) | Epoxide (g.) | Coreactant (g.) | Temp. (° C.) | Time (hrs.) | Copolymer (g.) | $\eta$ At 25° C. (cks.) |
|---|---|---|---|---|---|---|---|
| Number: | | | | | | | |
| 1 | 56.3 | PO, 41.1 | Eg, 3.1 | 175 | 11 | 89.6 | 312 |
| 2 | 56.3 | PO, 41.1 | Eg, 6.2 | 175 | 6 | 89.3 | 108 |
| 3 | 75.0 | EO, 36.5 | diEg, 1.0 | 175 | 23 | 86.1 | 1,148 |
| 4 | 75.0 | EO, 44.2 | diEg, 10.0 | 173 | 20 | 104.9 | 236 |
| 5 | 56.3 | PO, 41.1 | Gly, 8.9 | 175 | 22 | 89.6 | 241 |
| 6 | 56.3 | PO, 41.1 | TEA, 15.3 | 200 | 6 | 100.2 | 235 |
| 7 | 56.3 | PO, 41.1 | PgME, 5.4 | 175 | 46 | 85.2 | 222 |
| 8 | 56.3 | PO, 41.1 | EgPE, 5.3 | 175 | 48 | 84.1 | 425 |
| 9 | 37.5 | PO, 82.2 | E-100, 10.2 | 130 | 2 | 36.0 | 123 |
| 10 | 37.5 | PO, 82.2 | E-300, 10.1 | 130 | 22.2 | 67.8 | 281 |
| 11 | ¹1,495.4 | PO, 584.7 | E-300, 240.0 | 153 | 22 | 2,046.7 | 8,049 |
| 12 | 37.5 | PO, 41.1 | P-400, 39.8 | 177 | 6 | 101.9 | 118 |
| 13 | 315.0 | PO, 233.7 | CP-3000, 2,000.0 | 180 | 20 | 2,456.0 | 514 |
| 14 | 210.0 | PO, 155.8 | CP-4100, 1,880.0 | 180 | 5 | 2,125.2 | 658 |
| 15 | 75.0 | PO, 41.0 | PVA, 10.1 | 105 | 20 | 77.5 | Viscous |
| 16 | ²49.8 | PO, 82.0 | CH₃OH, 0.4 | 100 | 21 | 38.8 | Viscous |
| 17 | 375.0 | EO, 217.4 | Oct, 34.1 | 145 | 5 | 579.2 | 283 |
| 18 | 367.5 | EO, 214.0 | Dodec, 49.1 | 174 | 5 | 591.5 | 303 |
| 19 | 322.5 | EO, 189.5 | Octadec, 62.0 | 168 | 4.5 | 534.0 | 332 |
| 20 | 75.0 | EO, 48.3 | Esso-20, 30.0 | 175 | 20 | 119.5 | Viscous |
| 21 | 75.0 | PO, 57.4 | Isoprop, 3.5 | 150 | 21 | 108.4 | 296 |
| 22 | 75.0 | PO, 57.4 | t-Butyl, 3.9 | 150 | 20 | 112.3 | 346 |
| 23 | 75.0 | EO, 48.0 | MTP, 14.0 | 174 | 22 | 123.1 | 216 |
| 24 | 75.0 | EO, 44.7 | Novo, 30.0 | 152 | 21 | 103.5 | Viscous |

¹ PhEtAz.
² AEM.

In experiments 11 and 16 above, PhEtAz and AEM replaced EtAz as the aziridine reactant. In the above experiments, EO=ethylene oxide; PO=propylene oxide; PhEtAz=N-phenethylaziridine; AEM=2-(1-aziridinyl) ethyl methacrylate; Eg=ethylene glycol; diEg=diethylene glycol; Gly=glycerol; TEA=triethanol amine; PgME= propylene glycol methyl ether; EgPE=ethylene glycol phenyl ether; E-300=polyethylene glycol having an average molecular weight of about 300; P-400=polypropylene glycol having an average molecular weight of 400; CP-3000=a glycerine initiated polyoxypropylene glycol having an average molecular weight of about 3000; CP-4100=a glycerine initiated polyoxyalkylene glycol wherein the polyoxyalkylene portion is a heteric mixture of oxyethylene and oxypropylene groups in about a 80:20 to 90:10 molar ratio, respectively, and has an average molecular weight of about 4100; PVA=polyvinyl-alcohol; Oct=1-octanol; Dodec=1-dodecanol; Octadec=1-octadecanol; "Esso-20"=a commercially available product which is a mixture of higher alcohols predominantly 1-eicosanol; isoprop=isopropanol; t-butyl=t-butanol; MTP=4-(methylthio)phenol; Novo=a novolac resin having a functionality of about 6.0 to about 6.5.

EXAMPLE 7

Oxamination reaction in the presence of coreactants other than water and alcohols Using substantially the same equipment and procedure set forth in the General Procedure, several experiments were conducted wherein N-ethylaziridine and propylene oxide were reacted with various representative coreactants. The results are tabulated below.

TABLE VI

| | EtAz (g.) | PO (g.) | | Temperature (° C.) | Time (hrs.) | Copolymer (g.) | $\eta$ At 25° C. (cks.) |
|---|---|---|---|---|---|---|---|
| Number: | | | | | | | |
| 1 | 75.0 | 53.3 | Benzoic acid, 12.0 | 42 | 16.0 | 31.5 | (¹) |
| 2 | 75.0 | 53.3 | do | 150 | 16.0 | 117.4 | 265 |
| 3 | 75.0 | 53.3 | Adipic acid, 15.0 | 43 | 21.5 | 53.7 | 168 |
| 4 | 75.0 | 53.3 | Methacrylic acid, 25.0 | 44-52 | 19.5 | 49.8 | 268 |
| 5 | 75.0 | 57.4 | Polyepichlorohydrin, 10.2 (M.W. 2,000). | 193 | 5.0 | 93.3 | 465 |
| 6 | 75.0 | 57.4 | n-Butylamine, 7.4 | 175 | 20.0 | 120.4 | 247 |
| 7 | 75.0 | 41.0 | Diethylamine, 7.0 | 175 | 20.0 | 90.0 | 145 |
| 8 | 75.0 | 53.3 | Foramimide, 8.8 | 152 | 16.0 | 120.4 | 270 |
| 9 | 75.0 | 53.3 | Acetamide, 6.0 | 175 | 20.0 | 86.7 | (¹) |
| 10 | 75.0 | 49.2 | Acrylamide, 10.1 | 176 | 17.0 | 97.1 | 1497 |
| 11 | 63.9 | 52.2 | Stearamide, 84.9 | 140-180 | 3.0 | 168.7 | (²) |
| 12 | 40.6 | 33.2 | Nylon, 34.6 | 160-175 | 1.5 | 36.7 | Solid |
| 13 | 11.3 | 8.2 | Sugar, 50.0 | 110 | 5.0 | 28.4 | Solid |
| 14 | 1.5 | 0.8 | Cotton linters, 10.0 | 175 | 16.0 | 11.2 | Solid |
| 15 | 5.2 | 2.1 | Cellulose, 18.9 | 130 | 2.5 | 21.1 | Solid |
| 16 | 13.7 | 5.6 | Methylcellulose, 49.5 | 115 | 5.0 | 56.0 | Solid |
| 17 | 4.4 | 3.6 | Corn starch, 182.0 | 105 | 4.0 | | Solid |

¹ Liquid.
² Viscous.

The product of 9 was washed with water, product of 12 was washed with methanol, and the products of 13, 15 and 16 were washed with benzene to remove any residual reactants.

EXAMPLE 8

Reaction between N-phenylaziridine and ethylene oxide

Using substantially the same equipment and procedure set forth in Example 3, N-phenylaziridine (12.0 g.) was reacted with ethylene oxide (86.8 g.) for 19 hours at 150° C. under autogenous pressure. The volatiles were removed under reduced pressure yielding 12.7 g. of water-insoluble product. The product had the following elemental analysis based on the repeating unit

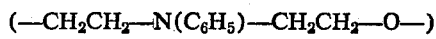

TABLE VII

| Percent: | Theory | Found |
|---|---|---|
| C | 73.59 | 73.18 |
| H | 8.02 | 7.87 |
| N | 8.58 | 9.07 |
| O | 9.80 | 9.75 |

EXAMPLE 9

Reaction in an inert solvent

Using substantially the same equipment and procedure as in Example 3 above, with the exception that 50 ml. of benzene was included as a reaction medium, 37.5 g. of EtAz was reacted with 24.6 g. of PO for 22 hours at 174° C. under autogenous pressure. The liquid product weighed 46.1 g. The product obtained was the same as the copolymers in Example 3.

EXAMPLE 10

Reaction between N-ethylaziridine and propylene sulfide

Using substantially the same equipment and procedure set forth in Example 3, 67.5 g. of N-ethylaziridine was reacted with 42.1 g. of propylene sulfide for 20 hours at 174° C. under autogenous pressure. The liquid copolymer (41.5 g.) had the following elemental analysis based on the repeating unit

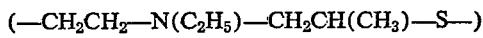
$(-CH_2CH_2-N(C_2H_5)-CH_2CH(CH_3)-S-)$

TABLE VIII

| Percent: | Theory | Found |
|---|---|---|
| C | 54.91 | 55.44 |
| H | 9.98 | 9.98 |
| N | 10.67 | 10.34 |
| S | 24.43 | 22.85 |

EXAMPLE 11

Thiamination reaction in the presence of coreactants

Using substantially the same equipment and procedure set forth in the General Procedure, several experiments were conducted wherein N-ethylaziridine (EtAz) and propylene sulfide (PS) were reacted with various representative coreactants. The results are tabulated below.

TABLE IX

| Number: | EtAz (g.) | PS (g.) | Coreactant (g.) | Temperature (° C.) | Time (hrs.) | Copolymer (g.) | Physical state of product |
|---|---|---|---|---|---|---|---|
| 1 | 67.5 | 42.2 | H₂O, 0.05 | 173 | 16 | 55.6 | Liquid. |
| 2 | 75.0 | 56.3 | Benzoic acid, 12.0 | 150 | 18 | 92.2 | Do. |
| 3 | 75.0 | 56.3 | Adipic acid, 15.0 | 45 | 22 | 83.9 | Do. |
| 4 | 75.0 | 56.3 | Glycerol, 8.9 | 175 | 17 | 78.1 | Do. |
| 5 | 75.0 | 56.3 | n-Pentanol, 5.0 | 150 | 16 | 90.2 | Do. |

What is claimed is:

1. A process for preparing polyurethane compositions which comprises reacting a polyol with a compound containing a plurality of isocyanate or isothiocyanate groups in the presence of from about .005 to about 8 parts of catalyst per 100 parts of polyol; wherein, said catalyst comprises a coreactant chain extended or terminated copolymer comprising alternating ring-opened units of
   (A) an aziridine of the formula

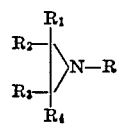

wherein
   (1) R is an inert hydrocarbon group;
   (2) $R_1$, $R_2$, $R_3$ and $R_4$ are hydrogen, alkyl, aryl or aralkyl groups, at least two of them being hydrogen; and
   (B) a vicinal epoxide or episulfide of the formula

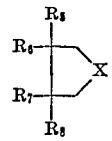

wherein
   (1) X is oxygen or sulfur;
   (2) $R_5$, $R_6$, $R_7$ and $R_8$, are hydrogen, alkyl, aryl, alkaryl, aralkyl, alkenyl, alkoxy-alkyl, alkenyloxyalkyl, or $R_6$ and $R_7$ join to form a 5 or 6 membered cycloalkyl group, at least two of them being hydrogen;
said copolymer having the general formula

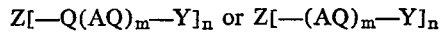
$Z[-Q(AQ)_m-Y]_n$ or $Z[-(AQ)_m-Y]_n$ wherein
   (1) Z is the residue derived by the removal of $n$ active hydrogens from said coreactant;
   (2) A is a ring-opened unit of said aziridine;
   (3) Q is a ring-opened unit of said vicinal epoxide or episulfide;
   (4) AQ is a repeating copolymer unit having the structural formula

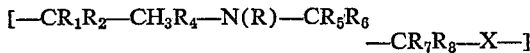
$[-CR_1R_2-CH_3R_4-N(R)-CR_5R_6$
$-CR_7R_8-X-]$ (5) Y is hydrogen or $-CR_1R_2-CR_3R_4-NHR$;
   (6) $m$ is an integer of from 2 to about 1000; and
   (7) $n$ is an integer of at least 1 and is equal to the number of active hydrogens abstracted from said coreactant.

2. The process of claim 1 wherein said coreactant is an aliphatic polyol, a phenol, a primary or secondary amine, a carboxylic acid amide, a thiol, a carboxylic acid having a Ka less than $6.5 \times 10^{-2}$, an oxyalkylated derivative prepared by condensing an alkylene oxide onto any of the above, water, hydrogen sulfide, ammonia, carbohydrates, or proteins.

3. The process of claim 2 wherein said coreactant is water.

4. The process of claim 3 wherein the polyol is a glycerine-initiated polyoxyalkylene glycol and the compound containing a plurality of isocyanate groups is toluenediisocyanate.

5. The process of claim 2 wherein the coreactant is a carboxylic acid amide.

6. The process of claim 5 wherein the carboxylic acid amide is a polyamide.

7. The process of claim 2 wherein the coreactant is a polyalkylene polyamine.

8. The process of claim 2 wherein the coreactant is a polyalkylenimine.

9. The process of claim 2 wherein the coreactant is a carbohydrate selected from sugars, cellulose, starch, gums or methyl cellulose.

10. The process of claim 2 wherein the coreactant is an alkanol amine.

11. A process for preparing polyurethane compositions which comprises reacting a polyol with a compound containing a plurality of isocyanate or isothiocyanate groups in the presence of from about .005 to about 8 parts of catalyst per 100 parts of polyol; wherein, said catalyst comprises a coplymer comprising alternating ring-opened units of
(A) an aziridine of the formula

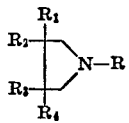

wherein
(1) R is an inert hydrocarbon group;
(2) $R_1$, $R_2$, $R_3$ and $R_4$ are hydrogen, alkyl, aryl aralkyl groups, at least two of them being hydrogen; and
(B) a vicinal epoxide or episulfide of the formula

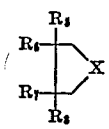

wherein
(1) X is oxygen or sulfur;
(2) $R_5$, $R_6$, $R_7$ and $R_8$ are hydrogen, alkyl, aryl, alkaryl, aralkyl, alkenyl, alkoxy-alkyl, alkenyloxyalkyl, or $R_6$ and $R_7$ join to form a 5 or 6- membered cycloalkyl group, at least two of them being hydrogen;
said copolymer being characterized as having from 2 up to about 1000 repeating units represented by the general formula $$\{CR_1R_2\text{---}CR_3R_4\text{---}N(R)\text{---}CR_5R_6\text{---}CR_7\text{---}R_8\text{---}X\}$$

References Cited
UNITED STATES PATENTS
| | | | |
|---|---|---|---|
| 3,476,933 | 11/1969 | Mendelsohn | 260—2.5 |
| 3,345,309 | 10/1967 | Merten | 260—2.5 |

FOREIGN PATENTS
| | | | |
|---|---|---|---|
| 3,234,153 | 2/1966 | Britain | 260—77.5 X |
| 1,118,965 | 12/1961 | Germany | 260—2.5 |

OTHER REFERENCES
Jefferson Chemical Co., Product Data, Flexible Polyol, Thanol F–300, March 1964, pp. 1 to 3.

DONALD E. CZAJA, Primary Examiner

C. W. IVY, Assistant Examiner

U.S. Cl. X.R.

260—2.5 AB, 2.5 AC, 2.5 AQ, 75 NB, 75 NC, 77.5 AB, 77.5 AC, 77.5 AQ

PO-1050
(5/69)

UNITED STATES PATENT OFFICE
CERTIFICATE OF CORRECTION

Patent No. 3,704,270      Dated November 28, 1972

Inventor(s) Prella M. Phillips

It is certified that error appears in the above-identified patent and that said Letters Patent are hereby corrected as shown below:

Col. 2, line 20, delete "or" and insert --by--.

Col. 3, line 3, delete "$Z[-AQ)_m-Y]_n$" and insert --$Z[-(AQ)_m-Y]_n$--.

Col. 7, line 39, delete "porduced" and insert --produced--.

Col. 8, line 75, delete "in frared" and insert --infrared--.

Col. 9, line 23, Table II, delete "Liiudq" and insert --Liquid--.

Col. 9, Table III, 3rd column, 10th line, delete "43,7" and insert --43.7--.

Col. 10, line 3, delete "." and insert --;--.

Col. 11, Table V, 4th column, delete "E-100, 10.2" and insert --E-300, 10.2--.

Col. 12, Table VI, 4th column, insert heading --Coreactant (g)--.

Col. 14, line 28, in formula delete "$CH_3R_4$" and insert --$CR_3R_4$--.

Col. 15, line 4, delete "copiymer" and insert --copolymer--.

Signed and sealed this 25th day of December 1973.

(SEAL)
Attest:

EDWARD M. FLETCHER, JR.      RENE D. TEGTMEYER
Attesting Officer      Acting Commissioner of Patents